(12) United States Patent
Bishop et al.

(10) Patent No.: US 8,431,508 B2
(45) Date of Patent: Apr. 30, 2013

(54) INORGANIC STRUCTURE FOR MOLECULAR SEPARATIONS

(75) Inventors: Karl D. Bishop, Orono, ME (US); Tyler J. Kirkmann, Brewer, ME (US)

(73) Assignee: Cerahelix, Inc., Orono, ME (US)

( * ) Notice: Subject to any disclaimer, the term of this patent is extended or adjusted under 35 U.S.C. 154(b) by 1012 days.

(21) Appl. No.: 12/262,164

(22) Filed: Oct. 30, 2008

(65) Prior Publication Data

US 2009/0131244 A1 May 21, 2009

Related U.S. Application Data

(60) Provisional application No. 60/983,808, filed on Oct. 30, 2007.

(51) Int. Cl.
*B01J 29/00* (2006.01)

(52) U.S. Cl.
USPC ............ 502/60; 502/7; 210/490; 210/500.25

(58) Field of Classification Search ................... 502/60, 502/527; 977/704
See application file for complete search history.

(56) References Cited

U.S. PATENT DOCUMENTS

| | | | |
|---|---|---|---|
| 4,310,440 A | 1/1982 | Wilson et al. | |
| 5,716,526 A | 2/1998 | Kelemen et al. | |
| 5,723,397 A | 3/1998 | Verduijn | |
| 6,177,373 B1 | 1/2001 | Sterte et al. | |
| 6,536,604 B1 | 3/2003 | Brinker et al. | |
| 6,620,402 B2 | 9/2003 | Jacobsen et al. | |
| 6,667,265 B1 | 12/2003 | Tomita et al. | |
| 6,730,537 B2 | 5/2004 | Hutchison et al. | |
| 7,195,872 B2 | 3/2007 | Agrawal et al. | |
| 7,229,944 B2 * | 6/2007 | Shao-Horn et al. | 502/182 |
| 7,357,836 B2 | 4/2008 | Tsapatsis et al. | |
| 7,442,573 B2 | 10/2008 | Hutchison et al. | |
| 7,608,554 B2 | 10/2009 | Tomita et al. | |
| 7,626,192 B2 | 12/2009 | Hutchison et al. | |
| 2006/0178580 A1* | 8/2006 | Nakamura et al. | 600/438 |
| 2006/0266696 A1 | 11/2006 | Masuda et al. | |
| 2007/0128423 A1 | 6/2007 | Belfort et al. | |
| 2007/0173399 A1 | 7/2007 | Lau et al. | |
| 2007/0251389 A1 | 11/2007 | Katsir et al. | |

(Continued)

FOREIGN PATENT DOCUMENTS

JP 06239674 8/1994

OTHER PUBLICATIONS

Constructing Novel Materials With DNA. LaBean, Nanotoday. Apr. 2007. vol. 2.*

(Continued)

*Primary Examiner* — M. Curtis Mayes
*Assistant Examiner* — Colette Nguyen
(74) *Attorney, Agent, or Firm* — Greenberg Traurig, LLP; Chinh H. Pham; Fang Xie

(57) ABSTRACT

A process of producing a structure for molecular separations includes providing a plurality of biopolymers. The biopolymers are selected from DNAs, RNAs, nucleic acid loops, nucleic acid hairpins, nucleic acid dumbbells, alkylated phosphonates, non-standard nucleobases, or combinations thereof. A sieve material, suitable for producing a structure for molecular separations, is provided around the biopolymers. The biopolymers are positioned in an arrangement for leaving pores suitable for molecular separations. The biopolymers are removed to leave pores in the sieve material and produce the structure suitable for molecular separations.

14 Claims, 1 Drawing Sheet

U.S. PATENT DOCUMENTS

| | | |
|---|---|---|
| 2007/0265484 A1 | 11/2007 | Li et al. |
| 2008/0105613 A1 | 5/2008 | Ichikawa et al. |
| 2009/0114089 A1 | 5/2009 | Liu et al. |
| 2009/0131244 A1 | 5/2009 | Bishop et al. |
| 2009/0299043 A1 | 12/2009 | Martin et al. |
| 2010/0116130 A1 | 5/2010 | Carreon et al. |

OTHER PUBLICATIONS

Preparation of Porous Materials with Ordered Hole Structure. Hoa et al. Jul. 2006.*

DNA-Templated Nanofabrication. Becerril et al. Jun. 2008. Chem. Soc. Rev.*

"Preparation of Porous Materials With Ordered Hole Structure" Hoa et al. (2006) 9-23.*

"Construction Novel Materials With DNA". LaBean et al. Nanotoday, 2007.*

Jareman, et al., The Influence of the Calcination Rate on Silicalite-1 Membranes, Microporous and Mesoporous Materials 79, (2005), pp. 1-5.

Lecloux, et al., High-temperature catalysts through sol-gel synthesis, Journal of Non-Crystalline Solids 225 (1998), pp. 146-152.

Anderson, Green Technology for the 21st Century: Ceramic Membranes, Water Chemistry Program, University of Wisconsin-Madison, pp. 1-10.

Fain, Development of Inorganic Membranes for Gas Separation, Manuscript U.S. Government Under Contract DE-AC05-98OR22700, pp. 1-10.

Yu, et al., Ultra-Thin Porous Silica Coated Silver-Platinum Alloy Nano-Particle as a new Catalyst Precursor, Chem. Commun., 2003, pp. 1522-1523.

Ford et al., Platinated DNA as Precursors to Templated Chains of Metal Nanoparticles, Advanced Materials, 2001, pp. 1-5.

Che et al., Synthesis and Characterization of Chiral Mesoporous Silica, Nature, vol. 429, 2004, pp. 281-284.

Hoa, et al., Preparation of Porous Materials with Ordered Hole Structure, Advances in Colloid and Interface Science 121, 2006, pp. 9-23.

Winkle, et al., Magnetic-Field-Alignment of Cholesteric Liquid-Crystalline DNA, Physical Review E, vol. 55, No. 4, 1997, pp. 4354-4359.

Labean, et al., Constructing Novel Materials with DNA, Nanotoday, 2007, vol. 2, No. 2, pp. 26-35.

Moses, et al., Characterization of Single- and Double-Stranded DNA on Gold Surfaces, American Chemical Society, 2004, pp. 11134-11140.

Ruckert, et al., Alignment of Biological Macromolecules in Novel Nonionic Liquid Crystalline Media for NMR Experiments, American Chemical Society, 2000, pp. 7793-7797.

Solberg, et al., Adsorption of DNA into Mesoporous Silica, American Chemical Society, 2006, pp. 15261-15268.

Freemantle, Membranes for Gas Separation, Chemical & Engineering News, 2005, vol. 83, No. 40, pp. 49-57.

Davis, et al., "Bacterial templating of ordered macrostructures in silica and silica-surfactant mesophases"; Nature, vol. 385, pp. 420-423, Jan. 1997.

Zhang, et al., "Bacterial templating of zeolite fibres with hierarchical structure"; The Royal Society of Chemistry; Chem. Commun., pp. 781-782, Mar. 2000.

* cited by examiner

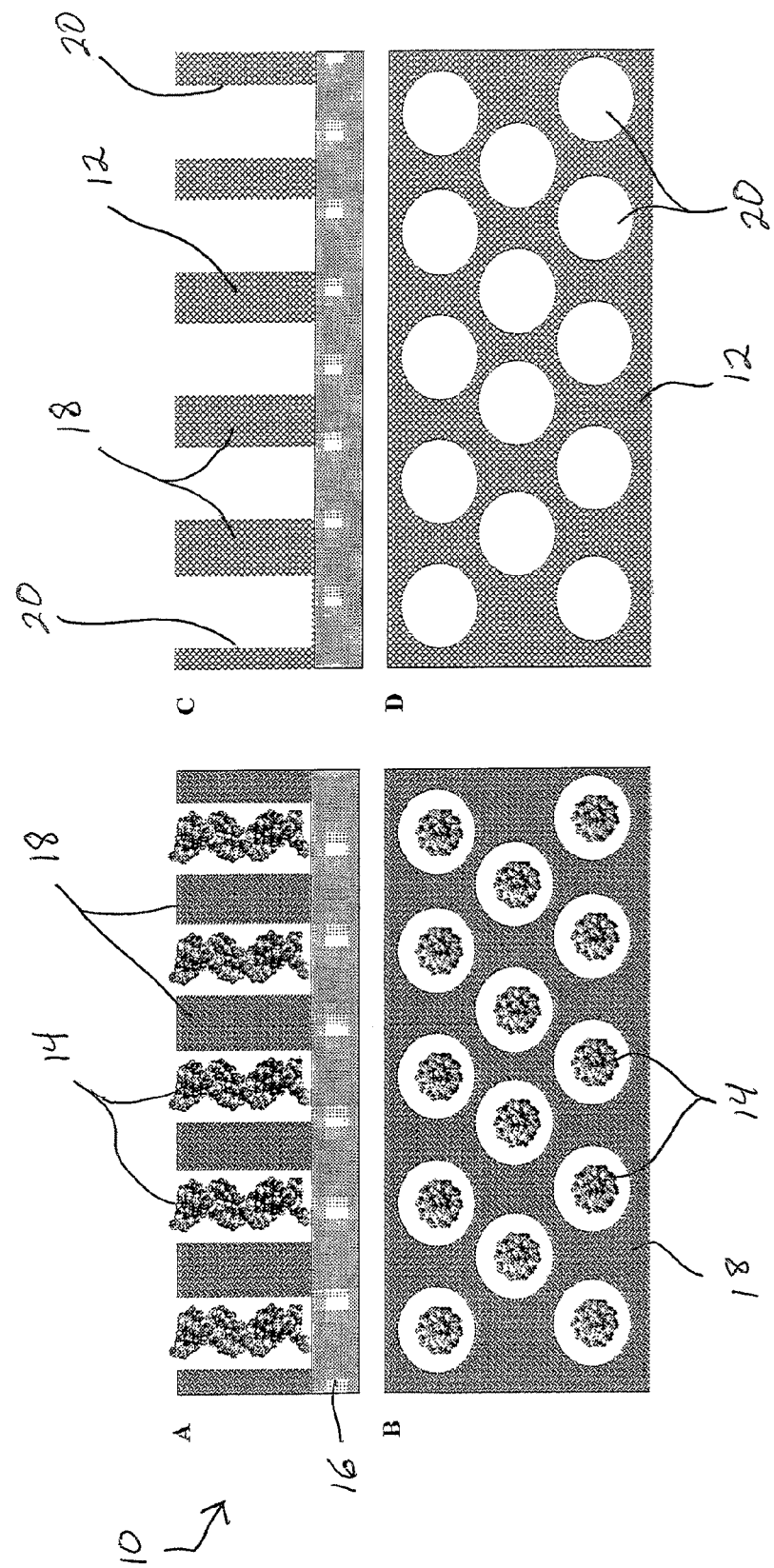

INORGANIC STRUCTURE FOR MOLECULAR SEPARATIONS

CROSS-REFERENCE TO RELATED APPLICATIONS

This application claims the benefit of U.S. Provisional Application No. 60/983,808, filed Oct. 30, 2007, the disclosure of which is incorporated herein by reference.

BACKGROUND OF THE INVENTION

A number of different structures are known for use in molecular separations. The size of the pores of the structure defines the upper limit of the dimensions of the molecules that can pass through it. For example, zeolites and microporous silica membranes have pore sizes of up to 9 angstroms. Mesoporous membranes have pore sizes which are 20 angstroms and larger. This leaves a gap between pore sizes of 9 and 20 angstroms which is not addressed sufficiently by current technology. Many important organic and biological molecules fall into this size range. The paucity of synthetic methods available for creating suitable structures having pore sizes within this range has limited the use of these structures in the separation of such molecules.

SUMMARY OF THE INVENTION

A process of producing a structure for molecular separations includes providing a plurality of biopolymers. The biopolymers are selected from DNAs, RNAs, nucleic acid loops, nucleic acid hairpins, nucleic acid dumbbells, alkylated phosphonates, non-standard nucleobases, or combinations thereof. A sieve material, suitable for producing a structure for molecular separations, is provided around the biopolymers. The biopolymers are positioned in an arrangement for leaving pores suitable for molecular separations. The biopolymers are removed to leave pores in the sieve material and produce the structure suitable for molecular separations.

An assembly for producing a structure for molecular separations includes a substrate and a plurality of biopolymers on the substrate. The biopolymers are selected from DNAs, RNAs, nucleic acid loops, nucleic acid hairpins, nucleic acid dumbbells, alkylated phosphonates, non-standard nucleobases, or combinations thereof. The biopolymers are positioned in an arrangement for leaving pores suitable for molecular separations when the biopolymers are removed. A sieve material is positioned on the substrate around the biopolymers. The sieve material has a composition and is shaped for producing the structure for molecular separations after removal of the biopolymers.

A membrane for molecular separations includes a membrane made from a suitable sieve material, the membrane having opposed major surfaces. The membrane has pores in at least one of the major surfaces. The pores have a diameter between 10 angstroms and 19 angstroms.

A process of producing a catalyst includes attaching catalytic materials to biopolymers. A catalyst substrate material is positioned around the biopolymers. The biopolymers are removed to leave pores in the catalyst substrate material, with the catalytic materials attached to the pores.

Various aspects of this invention will become apparent to those skilled in the art from the following detailed description of the preferred embodiments, when read in light of the accompanying drawings.

BRIEF DESCRIPTION OF THE DRAWINGS

FIG. 1A is a side view of an assembly for producing a ceramic membrane for molecular separations, including DNA molecules attached to a surface, and a ceramic material applied onto the surface and around the DNA to form a membrane.

FIG. 1B is a top view of the assembly.

FIG. 1C is a side view of the ceramic membrane on the surface after the DNA molecules have been removed to leave pores extending through the membrane.

FIG. 1D is a top view of the ceramic membrane.

DETAILED DESCRIPTION OF THE PREFERRED EMBODIMENTS

The invention relates to a process of producing an inorganic structure for molecular separations. The process includes providing a plurality of biopolymers. The biopolymers are selected from the group consisting of DNAs, RNAs, nucleic acid loops, nucleic acid hairpins, nucleic acid dumbbells, alkylated phosphonates, non-standard nucleobases, or any combinations thereof. Any type of DNA and any type of RNA can be used, including single-stranded DNA, double-stranded DNA, triple-stranded DNA, quadruplex DNA, single-stranded RNA and double-stranded RNA.

The double-stranded DNA molecule has physical and chemical characteristics that make it particularly suitable for use in the process. It has a diameter suitable for producing pores in an inorganic structure by the process as described below, and it has a length that can be controlled through means such as chemical synthesis and chemical manipulation by enzymes. DNA can be attached to surfaces using a variety of chemical and physical methods.

The biopolymers are provided in a sufficient number to leave pores in a structure effective for molecular separations as discussed below. The number of pores can vary widely, for example between 100 and 10,000, depending on the particular structure and its application.

The process also includes providing a sieve material around the biopolymers. The sieve material can be any material that is suitable for producing the structure for molecular separations described herein, such as many of the materials typically used in molecular sieves. The sieve material may be thermally and chemically stable. In some embodiments, the sieve material may be a polymer or any other inorganic and/or organic material suitable for producing a molecular sieve.

In a particular embodiment, the sieve material is a material that produces a ceramic structure. The term ceramic refers to complex compounds and solid solutions of both metallic and nonmetallic elements joined by ionic and covalent bonds. Most often, ceramic materials are a combination of inorganic elements. Occasionally, ceramic materials may contain carbon. Examples of ceramic materials include but are not limited to metal oxides, compounds of metal oxides, metal carbides, and nitrides, and carbonates. More specifically, for example ceramic materials include but are not limited to silica, titania, alumina, titanium silicate, barium titanate, titanium carbide, titanium nitride, aluminum nitride, silicon carbide, and silicon nitride.

Methods of producing ceramic structures are well-known. For example, a sol-gel process uses ceramic precursors in solution. The precursor sol can be deposited to form a film or other structure, or cast in a suitable mold with the desired shape, and it forms a gel. The gel is subjected to thermal treatment and/or polymerization to form a solid ceramic structure.

In a particular example, the parameters determining sol-gel synthesis have been investigated. A criterion in the development of the DNA templated membrane is controlling the rate of sol-gel polymerization. In one embodiment, the DNA/sol-gel composite remains in a fluid state until it is placed in a magnetic (or electric) field wherein the DNA is given a chance to align. Once the alignment is complete the sol-gel may be polymerized quickly. Conditions such as pH, temperature, and solvent can influence polymerization rate. DNA has been encapsulated in a sol-gel which polymerized in as short as 10 seconds and as long as 6 hours.

The sieve material is formed into the desired shape of the structure for molecular separations. For example, this structure can be a membrane or other structure having any desired shape which can be either solid or hollow. In one embodiment, the sieve material is formed into a membrane by applying it onto a surface by any suitable method, such as pouring or spraying.

The sieve material is positioned around the biopolymers. This may include either partially or completely surrounding the biopolymers with the sieve material. For example, in one embodiment the biopolymers are surrounded on their sides but not on their ends with the sieve material. FIGS. 1A and 1B shows an example of an assembly 10 for producing a ceramic membrane 12 for molecular separations. A plurality of DNA molecules 14 are attached to the surface of a substrate 16. The attachment of the DNA molecules to the surface can be accomplished using a variety of known attachment chemistries. The choice of attachment chemistry will depend on the conditions and specifications of the desired molecular separation membrane to be produced. In alternative embodiments, the DNA molecules are not attached to the surface. A sol-gel 18 has been applied onto the substrate 16 and around the DNA molecules 14, the sol-gel surrounding the DNA molecules on their sides but not their ends.

In other examples, the biopolymers can be surrounded except for one end by the sieve material, or they can be encapsulated by the sieve material. For example, this may occur when the DNA molecules are mixed into a sol-gel, and then the sol-gel is formed into a desired structure for molecular separations.

The process also includes positioning the biopolymers in an arrangement for leaving pores suitable for molecular separations, after the biopolymers have been removed from the sieve material to leave pores as described below. This can include any suitable arrangement of the biopolymers relative to one another and relative to the molecular separations structure, and any suitable orientation or alignment of the biopolymers. In the example shown in FIGS. 1A and 1B, the DNA molecules 14 are arranged in a regular pattern and are equally spaced relative to one another. Also, the DNA molecules 14 are oriented so that they extend generally perpendicular to the surface of the substrate 16 and generally parallel with one another. Alternatively, the DNA molecules could be positioned in a non-perpendicular and/or non-parallel orientation.

The orientation of the biopolymers can be achieved by any suitable method. For example, it may be achieved by the use of a magnetic or electric field applied to the DNA molecules, or by mechanical means, or by other physical conditions (concentration, application, etc.). The presence and composition of a surface and a variety of other conditions can also influence the orientation of the biopolymers. Under certain conditions the biopolymers may orient themselves without the use of external means. The positioning of the biopolymers in the desired arrangement can be take place either before or after the sieve material has been positioned around the biopolymers. In some embodiments, the positioning results in a highly oriented monolayer of biopolymers on a surface.

The process further includes removing the biopolymers to leave pores in the sieve material and produce a structure suitable for molecular separations. For example, as shown in FIGS. 1C and 1D, after the sol-gel 18 has hardened around the biopolymers to form a ceramic material, the DNA molecules 14 are removed to leave pores 20 in the ceramic material. The biopolymers can be removed by any suitable method. For example, they can be removed by calcining or any other known method.

The process described above uses the biopolymers as a template for the formation of a desired porous structure for molecular separations.

In one embodiment, the process includes an additional step, after removing the biopolymers to leave the pores, of reducing the diameter of the pores in a controlled fashion. The ability to reduce the diameter of the pores in a controlled fashion could make an entire range of desired pore sizes available. The diameter of the pores can be reduced by any suitable means, for example, by atomic layer deposition or other known methods. This step could also provide the capability of modifying the surface of the pores to provide desired physical and chemical characteristics.

In another embodiment, the process includes an additional step of attaching catalytic materials to the biopolymers before providing the sieve material around the biopolymers, and leaving the catalytic materials attached to the pores when the biopolymers are removed. The use of catalytic materials is described in more detail below.

The invention also relates to an assembly for producing a structure for molecular separations. The assembly includes a substrate, and a plurality of biopolymers such as those described above on the substrate. The biopolymers are positioned in an arrangement for leaving pores suitable for molecular separations when the biopolymers are removed. The assembly also includes a sieve material positioned on the substrate around the biopolymers, the sieve material having a composition and being shaped for producing the structure for molecular separations after removal of the biopolymers.

The substrate can be any suitable platform upon which the structure for molecular separations can be produced. For instance, the substrate may be an alumina support. In the example shown in FIG. 1, the assembly 10 includes the substrate 16 which has a surface upon which the sieve material 18 is shaped to produce a membrane 12 for molecular separations.

In another embodiment (not shown), the substrate is a second membrane different from the molecular separations membrane. For instance, as described in the Example below, the substrate can be a different filtration membrane, such as a tubular ceramic nonofiltration membrane, or it can be any other suitable membrane having a different function and/or structure. Optionally, the second membrane can be combined with the molecular separations membrane to produce a combination membrane which provides different separations and/or functions.

In another embodiment, the assembly further includes catalytic materials attached to the biopolymers. Such catalytic materials are described in more detail below.

The invention also relates to a membrane for molecular separations. The membrane is made from a sieve material and it has opposed major surfaces. The membrane has pores in at least one of the major surfaces, the pores extending generally perpendicular to the major surface. In some embodiments, the pores extend completely through the membrane between the major surfaces. Most previously known molecular separation membranes have randomly oriented pores that interconnect allowing molecules to eventually find a path through the membrane. The membrane of the invention thus provides an advantage over current technology. The back pressure or pressure drop across the membrane is very low, and the molecules have an easy way through the membrane.

The pores in the membrane can have any diameter suitable for molecular separations. By "diameter" is meant the diameter of the pore if it is circular in cross-section, or the smallest diameter of the pore if it is not circular and thus has different diameters. In some embodiments, the pores have a diameter between 5 angstroms and 30 angstroms. In a particular embodiment, the pores have a diameter between 10 angstroms and 19 angstroms, and more particularly between 12 angstroms and 17 angstroms.

In some embodiments, the pores are substantially uniform or homogeneous in size, cross-section, orientation and/or in other properties or structures. The pores can have any suitable cross-section, for example a substantially circular cross-section as mentioned above.

The pores can be oriented perpendicular to the major surface of the membrane, or they can be oriented non-perpendicularly. Also, the pores can be oriented parallel with one another or non-parallel. If the pores are not parallel with one another there will be more sieve material between the pores. This could provide more stability but would also reduce the porosity of the membrane. This feature could be used to tune the membrane characteristics for a particular application.

The pores can be included in any suitable total numbers and in any suitable numbers per unit area of the membrane. The membrane porosity can be controlled by controlling biopolymer concentration and/or surface density. In some embodiments, the pores are included in an ordered pattern. In some embodiment, the pores are substantially evenly spaced on the membrane surface.

The membrane can have any thickness suitable for molecular separations. In some embodiments, it has a thickness within a range of from about 0.1 micron to about 100 microns. An ultra-thin membrane can be useful for high throughput.

In some embodiments, the membrane further includes catalytic materials attached to the pores.

The membrane can be useful in many different types of molecular separations, including molecular separations of gases from their mixtures, and molecular separations of chemicals from a liquid. Potential customers are biorefineries which convert woody biomass to sugars, organic acids, and alcohols. Current membrane technologies can separate the sugars from acetic acid and furfurals. However, a new membrane technology is needed which will separate furfural compounds from acetic acid. A great advantage of molecular separation by membranes rather than distillation is lower cost primarily in energy savings. Other industries in which the membrane could be used include oil and petrochemical, coal gasification, pulp and paper, and natural gas producers.

The invention also relates to a process of producing a catalyst. The process includes attaching catalytic materials to bipolymers, positioning a catalyst substrate material around the biopolymers, and removing the biopolymers to leave pores in the catalyst substrate material, with the catalytic materials attached to the pores.

Any suitable catalytic materials can be used, such as metal atoms, metal ions or metal oxides. Suitable catalytic metals are well known, such as platinum, beryllium, rhodium, etc. Combinations of two or more catalytic materials can also be used. Also, any suitable biopolymers can be used, such as any of those described above or others. Further, any suitable catalyst substrate material can be used. It can be a ceramic material such as described above or any other material known for use as a catalyst substrate.

In some embodiments, the biopolymers are positioned on a surface, and the catalyst substrate material is applied onto the surface and around the biopolymers. This usually shapes the catalyst into the form of a membrane. However, other embodiments do not use a surface and/or produce catalysts with different shapes.

The catalytic materials are attached to locations on the biopolymers, which can be predetermined or random locations. Typically, when the biopolymers are removed from the catalyst substrate material, the catalytic materials are attached to corresponding locations on the pores of the material. In some embodiments, two or more different catalytic materials are attached to each of the biopolymers, so that when the biopolymers are removed the two or more catalytic materials are attached to the pores.

In some embodiments, the pores are positioned so that the catalyst also functions as a molecular sieve, but in other embodiments it functions solely as a catalyst.

Metal ions bind to nucleic acids through ionic and/or covalent interactions with the phosphodiester backbone or the aromatic rings. This property can be used with the membrane templating innovation described above to produce membranes with pore structures with surfaces which are decorated with metal atoms. It is conceivable that a variety of physical and chemical characteristics (e.g., selective molecular binding, catalytic activity, etc.) can be chosen based on the metals bound to the polymer prior to templating the membrane.

In a particular example, DNA can be used as a means to distribute metals in the pores of the membrane. Several transition metal (platinum, rhodium, rhenium, etc.) compounds bind to DNA. If these metals compounds are bound to the DNA then the DNA is used in templating a membrane it is possible to create a new class of catalysts with a high degree of control of composition (cluster size and distribution). The advantages would be improved dispersal of the catalyst and the ability to create well-defined binary (e.g., Pt—Rh) or ternary (e.g., Pt—Rh—Re) or higher complexity catalysts with very unique properties. Another advantage would be the ability to create not just a catalyst but a material that could perform separation and catalysis simultaneously.

In another particular example, a catalyst can be made that is not restricted to a layer or film. A bulk sol gel material with metal-DNA complexes encapsulated within it is made. The DNA is removed by high heat (calcining) leaving behind a ceramic with random pore orientation but decorated metal catalytic sites (metal atoms, ions, or oxides). This material could then be further processed and utilized as a catalyst.

Example 1

A ceramic membrane for molecular separations (hereinafter "molecular separations membrane") is produced as follows. A tubular ceramic nanofiltration membrane (hereinafter "nanofiltration membrane") is used as a substrate for forming the molecular separations membrane. The nanofiltration membrane is dipped into a sol-gel which contains DNA molecules, forming a coating on the nanofiltration membrane. The sol-gel coated nanofiltration membrane is then placed in a strong magnetic field which aligns the DNA molecules perpendicularly to the surface of the nanofiltration membrane while the sol-gel polymerizes and forms a ceramic membrane. Once the sol-gel is solidified, the DNA molecules are removed by calcining, leaving pores in the ceramic membrane to produce the molecular separations membrane.

The result is a combination ceramic membrane which includes a tubular nanofiltration membrane coated with a molecular separations membrane. The combination membrane has the high selectivity of the molecular separations membrane and the utility of the nanofiltration membrane. The molecular separations membrane allows separation of very small molecules (1 nm to 2 nm) from somewhat larger molecules.

The combination ceramic membrane may be used in many different applications. For example, it may be used in a cross-flow filtration process in which the feed stream moves parallel to the membrane filtration surface. Molecules larger than the pore size of the molecular separations membrane will pass through the long channels of the tubular nanofiltration membrane. The small molecules will pass through the molecular separations membrane as part of the permeate. An example of an application of this technology would be in the area of biorefinery commodity chemical separation.

Example 2

Task 1

Formation of Liquid Crystalline DNA in a Sol-Gel i. Rationale: The liquid crystalline state is a phase of matter that is ordered like crystalline solids but flow like a liquid. High density packing of polyanions like DNA can only be accomplished if the charge-charge repulsion of the phosphate groups is minimized by the addition of counterions. The structure of a hexagonal liquid crystalline phase of 150 base pair lengths of double-stranded DNA has been studied by small angle neutron scattering. In this study, hexagonal phase liquid crystalline monovalent tetramethylammonium ($TMA^+$) ions were used as counterions to facilitate the formation of the liquid crystalline state. The spacing between the long axes of the DNA in this state was determined to be 4 nm. Segments of DNA up to 100 persistent lengths (~5 μm) were shown to exhibit local hexagonal structure.

ii. Experimental Design and Methods: Several lengths of DNA ranging from 150 base pairs to 2000 base pairs will be produced by nuclease digestion of calf thymus DNA with subsequent separation by size exclusion chromatography. Design of Experiments (DoE) will be used to elucidate the optimum experimental conditions under which DNA will form a liquid crystalline state in the presence of the sol-gel. A table of 28 samples to be synthesized and screened will be generated.

Input factors for this study will include DNA concentration, sol-gel reactants, temperature, and pH. An experimental matrix will then be generated based on a D-Optimal design (NIST/SEMATECH, 2006). Because of the large number of possible conditions it is not practical to run a full factorial design. The D-optimal design option is an effective way to spread the points in experimental space to generate informative, non-redundant results. The upper and lower bounds define the ranges which should encompass the optimum conditions to form a sol-gel liquid crystalline DNA composite material. The synthesis proposed here will utilize cationic molecules which are similar to TMA but are known to facilitate the formation of liquid crystalline DNA (spermine, spermidine, and putrescine). The formation of the liquid crystalline state of DNA in the presence of sol-gel forming compounds could prove to be difficult. The Design of Experiments method (DoE) to select the optimum parameters described in this step will help establish optimum synthesis conditions.

iii. Data Analysis and Interpretation: Once the DNA templated material is formed it will be characterized using a variety of methods. DNA absorbs UV light very strongly having an extinction coefficient of 6600 $M^{-1}$ $cm^{-1}$ at 260 nm. If the DNA is encapsulated in the porous material there will be a strong UV absorbance of the material after extensive washing. Scanning electron microscopy will be conducted at the Laboratory for Surface Science and Technology, will be used to confirm the presence of any long range order. Successful synthesis will be confirmed through the observation of hexagonal phase order of channels up to about 7 μm in length. X-ray diffraction (XRD) and AFM will be utilized to determine the ordered state of the material. Previous XRD results of materials that have highly uniform pores with long range ordering (Kim 2001) will be compared to the results obtained for Task 1 (ii). The final step of Task 1 will be to remove the DNA. This will be done by calcining which is a common process for template destruction used in zeolite synthesis by heating to high temperature in the presence of air. The sample DNA/sol-gel composite will be heated in the presence of air to remove the DNA. The optimum temperature will be the minimum temperature necessary to completely remove the DNA. Characterization of the porous material will be performed by XRD as described above. A new method to estimate surface area of porous silica using FT-IR will be employed (McCool 2006).

iv. Potential Problems/Alternative Approaches: Removal of the DNA by calcining may introduce pore defects. The rate at which the sample is heated and cooled is critical to template removal and prevention of defects in the membrane (Dong 1998). Various temperature ramping protocols may need to investigated before an acceptable method is discovered. Chemical detachment or breakdown of the DNA are options to be explored should the calcining process prove detrimental to the membrane channels.

v. Expected Outcomes: Data analysis will show that DNA has been successfully encapsulated in silica. The DNA-silica composite will be ordered along the long axis of the DNA. Once the optimum conditions for removing DNA from the DNA-silica composite are determined, a highly porous ceramic material will be generated. The parallel pore structure of this new material will be visualized by electron microscopy.

Task 2

Synthesis of a DNA Templated Membrane i. Rationale: Inorganic membranes with a thickness of only a few microns need to be attached to a solid support to provide structural durability. The DNA templated membrane will be formed on a silicon crystal surface to allow ease of manipulation and characterization and facilitate the proof of concept. In order for the membrane to work as designed it will need to be attached to a macroporous material to allow free flow of molecules to the membrane surface. This problem will be addressed in future work which is beyond the focus of this project.

Many methods have been developed to covalently attach DNA to surfaces (Lin 2001; Lin 2002; Strother 2000; Yin 2004). These methods have focused primarily on using one or more linker molecules to attach the DNA to the surface. The use of a linker molecule was considered for this project. However, there is significant concern over the organization of the matrix of the sol-gel around the linker molecules near the attachment site. Due to this concern it was decided that direct linkage of the DNA to the surface was necessary for the prototype DNA templated membrane. A well established method for attaching DNA to surfaces is the formation of a sulfur-gold bond (Herne 1997; Kelley and Barton 1999; Leavitt 1994; Rabke-Clemmer 1994). Using the resources at the Laboratory for Surface and Technology gold nanoparticles will be distributed over a silicon surface in a density which will reflect the spacing between the DNA molecules found in the liquid crystalline material. This measure should improve the prospects of forming the membrane by matching the conditions found in Task 1.

ii. Experimental Design and Methods: Highly homogeneous DNA with a defined length and sequence will be used to form a layer of DNA with uniform thickness on the silicon surface. The DNA will be prepared from closed circular pieces of DNA called plasmids. The plasmids will be cut with restriction enzymes and purified by gel electrophoresis to provide the desired linear DNA strands. The actual length and source of DNA will be defined by the optimum parameters found in Task 1. Hydrogen sulfide terminated DNA oligonucleotides and their complementary DNA sequence will be purchased. The sequences will create an overhanging "sticky end" which will be complementary to the end of the restriction enzyme-cut plasmid. The complementary oligonucleotides will be allowed to hybridize and then will be combined with the prepared plasmid DNA and linked together using T4 DNA ligase which will covalently link the hydrogen sulfide terminated duplex to the plasmid. Once the DNA is incubated with the gold nanoparticle coated surface they will bind forming the DNA coated surface. The optimum sol-gel composition found in Task 1 will added to the surface bound DNA. The DNA/sol-gel composite will be placed in a 7 tesla magnetic field (Department of Chemistry, University of Maine) to align the DNA while the sol-gel polymerizes.

iii. Data Analysis and Interpretation—Characterization of Membrane-DNA Composite Characterization of the membrane-DNA composite material will be accomplished using a Zeiss focused ion beam scanning electron microscope which has a resolution of less than 1 nm. This resolution will allow the direct visualization of the membrane surface with features similar to the pattern shown in FIG. 2 B. Other techniques such as FT-IR and Xray photoelectron spectroscopy (XPS) will be utilized to characterize the chemical nature of the DNA/membrane surface.

iv. Potential Problems/Alternative Approaches: The chemical and physical structure of the pore walls after removal of the DNA is not known. Removal of the DNA template without altering the inorganic membrane structure could be difficult. Also, physical or chemical modification may be necessary before the membrane can be used for molecular separation. The magnetic field may not be strong enough to orient the DNA in the sol-gel. It is known that electric fields can orient DNA (Germishuizen, 2005; Suzuki, 1998; Kelly, 1998; Borejdo, 1989). Kelly, 1998 attached DNA helices at one end to a gold surface and oriented them perpendicular to the surface using an applied electric field. An electric field will be used to orient the DNA in a sol-gel if the magnetic field is not successful in orienting the DNA. The magnetic field alignment will be attempted first since no special connections to the membrane will be required as there would be for applying an electric field.

A significant concern at this step of the project is maintaining the orientation of the long axis of the DNA perpendicularly to the surface. It is possible that long strands of DNA may not remain perpendicular to the surface but instead form random coils (Parak 2003). Increasing the persistence length of the DNA by binding polyamines (cations) may help in maintaining the perpendicular conformation of the DNA and increase packing efficiency of DNA on the surface. If these measures are not successful in keeping the DNA perpendicular to the surface then other methods to modify the surface before and after binding the DNA will be investigated (e.g., Levicky 1998).

v. Expected Outcomes: Success of Task 2 will be experimental confirmation of the assembly of the DNA/membrane composite material. The conformational characteristics include the orientation of the DNA strands perpendicularly to the surface and their encapsulation within a sol-gel matrix.

Future Work

Characterization of DNA templated membrane—Removal of the DNA from the membrane without significantly altering the structure of the pores and causing defects is a serious concern. The 6 month timeframe of this project precludes multiple attempts of different methods to remove the DNA and characterize the membrane. Calcining is a simple process for removing templates used in making zeolites by heating the sample in the presence of air to temperatures in the range of 500° C. Therefore, calcining the membrane to remove the DNA is the first and best choice for simplicity. The optimum temperature for removing the DNA will not be known a priori. Guidance will be given by the minimum temperature needed to remove DNA from the sol-gel encapsulated liquid crystalline DNA from Task 1. However, the DNA/membrane composite is a more complex system. A critical question to be answered is whether the DNA can be "burned away" without altering the membrane structure. The temperature will be increased until the DNA is removed and the resultant porous material will be characterized by XRD, FIB-SEM, TEM, and gas desorption. If the calcining does not prove to be successful, other methods will be explored as time allows. These trials will investigate the breakage of the gold-sulfur bond and subsequent chemical dissolution of the DNA and other DNA attachment methods.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A process of producing a structure for molecular separations comprising:
   providing a plurality of DNA molecules;
   providing a material suitable for producing a structure having opposing major surfaces when the material is positioned around the DNA molecules;
   positioning the DNA molecules in an arrangement for leaving pathways formed by the DNA molecules that extend substantially transversely from one major surface of the structure to an opposing major surface of the structure; and
   removing the DNA molecules to leave the pathways formed by the DNA molecules that are substantially uniform in width along their length in the material, and through which pathways molecular separations occur.

2. The process of claim 1 wherein the DNA molecules are positioned before providing the material around the DNA molecules.

3. The process of claim 1 wherein the DNA molecules are positioned after providing the material around the DNA molecules.

4. The process of claim 1 wherein the material is formed into a membrane and the DNA molecules are positioned substantially perpendicularly to a major surface of the membrane.

5. The process of claim 4 wherein the DNA molecules are attached to a substrate surface and the material is applied onto the substrate surface and around the DNA molecules to form the membrane.

6. The process of claim 1 wherein the material produces a ceramic structure.

7. The process of claim 1 comprising an additional step, after removing the DNA molecules to leave the pathways, of reducing a diameter of the pathways in a controlled fashion.

8. The process of claim 1 comprising the additional steps of attaching catalytic materials to the DNA molecules before providing the material around the DNA molecules, and leaving the catalytic materials attached to the pathways when the DNA molecules are removed.

9. The process of claim 1 wherein the DNA molecules are single molecules of DNA.

10. The process of claim 9 wherein the DNA molecules are molecules of double-stranded DNA.

11. The process of claim 1 which further comprises controlling the length of the DNA molecules to control the length of the pathways.

12. The process of claim 1 which produces pathways in the material having a diameter between 5 angstroms and 19 angstroms.

13. The process of claim 1 wherein the DNA molecules are provided in a liquid crystalline state.

14. The process of claim 13 wherein the DNA molecules are single molecules of DNA.

* * * * *